(12) United States Patent
Ayzenfeld et al.

(10) Patent No.: US 10,678,549 B2
(45) Date of Patent: Jun. 9, 2020

(54) EXECUTING PROCESSOR INSTRUCTIONS USING MINIMAL DEPENDENCY QUEUE

(71) Applicant: INTERNATIONAL BUSINESS MACHINES CORPORATION, Armonk, NY (US)

(72) Inventors: Avraham Ayzenfeld, Hod Hasharon (IL); Eyal Naor, Tel-Aviv (IL); Amir Turi, Ramat Gan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/823,632

(22) Filed: Nov. 28, 2017

(65) Prior Publication Data

US 2019/0163481 A1    May 30, 2019

(51) Int. Cl.
*G06F 9/30*    (2018.01)
*G06F 9/312*    (2018.01)
*G06F 9/38*    (2018.01)

(52) U.S. Cl.
CPC ........ *G06F 9/3838* (2013.01); *G06F 9/30145* (2013.01); *G06F 9/30043* (2013.01); *G06F 9/3814* (2013.01); *G06F 9/3828* (2013.01); *G06F 9/3836* (2013.01); *G06F 9/3855* (2013.01); *G06F 9/3867* (2013.01)

(58) Field of Classification Search
CPC .. G06F 9/3838; G06F 9/30145; G06F 9/3832; G06F 9/3836; G06F 9/3814; G06F 9/3855; G06F 9/3829; G06F 9/3867; G06F 9/3828; G06F 9/30043
USPC .................................. 712/216–219
See application file for complete search history.

(56) References Cited

U.S. PATENT DOCUMENTS

| | | | |
|---|---|---|---|
| 7,350,056 B2 * | 3/2008 | Abernathy | G06F 9/3814 712/214 |
| 7,529,911 B1 * | 5/2009 | Spracklen | G06F 9/383 712/207 |
| 7,769,985 B2 * | 8/2010 | Barrick | G06F 9/3838 711/125 |
| 9,262,171 B2 | 2/2016 | Golla et al. | |
| 2004/0216001 A1 * | 10/2004 | Kalla | G06F 9/383 714/5.11 |

(Continued)

FOREIGN PATENT DOCUMENTS

EP    1012707 B1    7/2006

OTHER PUBLICATIONS

Etsion, Yoav, "Computer Architecture: Out-of-order Execution", Computer Architecture, 2013, 63 pages. URL: https://iis-people.ee.ethz.ch/~gmichi/asocd/addinfo/Out-of-Order_execution.pdf.

*Primary Examiner* — Daniel H Pan
(74) *Attorney, Agent, or Firm* — Cantor Colburn LP; William Kinnaman (57) ABSTRACT

Examples of techniques for executing instructions out of order are described herein. An example computer-implemented method includes receiving, via a processor, a plurality of instructions to be executed. The method includes sending, via the processor, an instruction to a minimal dependency queue in response to detecting the instruction includes a minimally dependent instruction. The method also includes selecting, via the processor, an instruction from a set of instructions that are eligible to be executed based on a scheme. The method further includes executing, via the processor, the instruction.

17 Claims, 5 Drawing Sheets

(56) References Cited

U.S. PATENT DOCUMENTS

| | | |
|---|---|---|
| 2016/0224351 A1 | 8/2016 | Comparan et al. |
| 2018/0081686 A1 | 3/2018 | Ho et al. |
| 2018/0181397 A1 | 6/2018 | Ostanevich et al. |
| 2019/0243647 A1 | 8/2019 | Anderson et al. |

\* cited by examiner

EXECUTING PROCESSOR INSTRUCTIONS USING MINIMAL DEPENDENCY QUEUE

BACKGROUND

The present techniques relate to processors. More specifically, the techniques relate to the execution of instructions in processors.

SUMMARY

According to an embodiment described herein, a system can include a processor to receive a plurality of instructions to be executed. The processor can also send an instruction from the plurality of instructions to a minimal dependency queue in response to detecting the instruction comprises a minimally dependent instruction. The processor can further select an instruction from a set of instructions that are eligible to be executed based on a scheme. The processor can also further execute the selected instruction.

According to another embodiment described herein, a method can include receiving, via a processor, a plurality of instructions to be executed. The method can also include sending, via the processor, an instruction from the plurality of instructions to a minimal dependency queue in response to detecting the instruction comprises a minimally dependent instruction. The method can further include selecting, via the processor, an instruction from a set of instructions that are eligible to be executed based on a scheme. The method can also include executing, via the processor, the selected instruction.

According to another embodiment described herein, an apparatus can include hardware logic to receive a plurality of instructions to be executed. The apparatus can also include hardware logic to send a first instruction from the plurality of instructions to a minimal dependency queue in response to detecting the first instruction comprises a minimally dependent instruction. The apparatus can further include hardware logic to send a second instruction from the plurality of instructions to a regular issue queue in response to detecting the second instruction comprises a dependent instruction. The apparatus can also further include hardware logic to perform a dependency check on instructions in the regular issue queue. The apparatus can also further include hardware logic to select an instruction from a set of instructions that are eligible to be executed based on a scheme. The apparatus can also further include hardware logic to execute the selected instruction.

DETAILED DESCRIPTION

Modern high performance CPUs may rely on deep pipelines and "out of order" (OOO) instruction execution for high performance. OOO execution is a paradigm used in many high-performance microprocessors to make use of instruction cycles that would otherwise be wasted by a certain type of costly delay. In this paradigm, a processor executes instructions in an order governed by the availability of input data, rather than by their original order in a program. In doing so, the processor can avoid being idle while waiting for the preceding instruction to complete to retrieve data for the next instruction in a program, processing instead the next instructions that are able to run immediately and independently. For example, in an OOO instruction execution, a CPU may have an OOO window on the next N instructions that are to be executed. The CPU can check which instructions are not dependent on other instructions, and can thus be executed from that window without waiting for a result of a former instruction. From the list of minimally dependent instructions, the CPU can then choose the next instruction to execute. For example, the next instruction to be executed may be the oldest instruction in the list. OOO execution may thus use a dependency check between all instructions to be executed. For example, the dependency check may be performed using a matrix of N×N instructions. In some examples, a dependency check may be performed for each instruction against any other instruction in the OOO window. Thus, increasing the out of order window may exponentially increase the size of the logic and wiring used. Furthermore, increasing the OOO window may increase the delay of the dependent instruction checking. Moreover, this increased delay may necessitate the use of extra pipe stages or cause latency limitations.

According to embodiments of the present disclosure, a processor can receive a plurality of instructions to be executed. The processor can send an instruction to a minimal dependency queue in response to detecting the instruction includes a minimally dependent instruction. For example, the minimally dependent instruction may be an instruction without any dependency on another instruction, a rejected instruction, or an instruction with a dependency on an instruction that is executed. The processor can select an instruction from a set of instructions that are eligible to be executed based on a scheme. For example, the processor can perform an age check on the instruction in the minimal dependency queue and select an instruction that passes the age check. The processor can then execute the selected instruction. Thus, embodiments of the present disclosure allow minimally dependent instructions to be executed without performing a dependency check before executing the minimally dependent instructions. As used herein, a dependency check refers to a process of comparing an instruction with all other instructions within an out-of-order window to determine if all the dependencies of the instruction have been resolved and the output data from the relied upon instructions are available. An out-of-order window refers to a batch of instructions that are currently being handled by the CPU. As used herein, minimally dependent instructions include instructions that do not have a regular dependency on another instruction. A regular dependency, as used herein, includes a part of an instruction that depends on the execution of another instruction. In some examples, dependent instructions having regular dependencies may be sent to a regular issue queue and have a dependency check performed. However, since the dependency check is performed only on the dependent instructions, the dependency checking may be significantly more efficient. Thus, the techniques described herein may result in more efficient dependency checking. For example, minimally dependent instructions can be issued and executed without dependency checking, resulting in saved cycles. Moreover, increasing the out-of-order window to include an additional n instructions to an m original amount of instructions may result in a smaller dependency matrix of (n+m)*n rather than (n+m)(n+m) as discussed in greater detail below.

Figure 1:
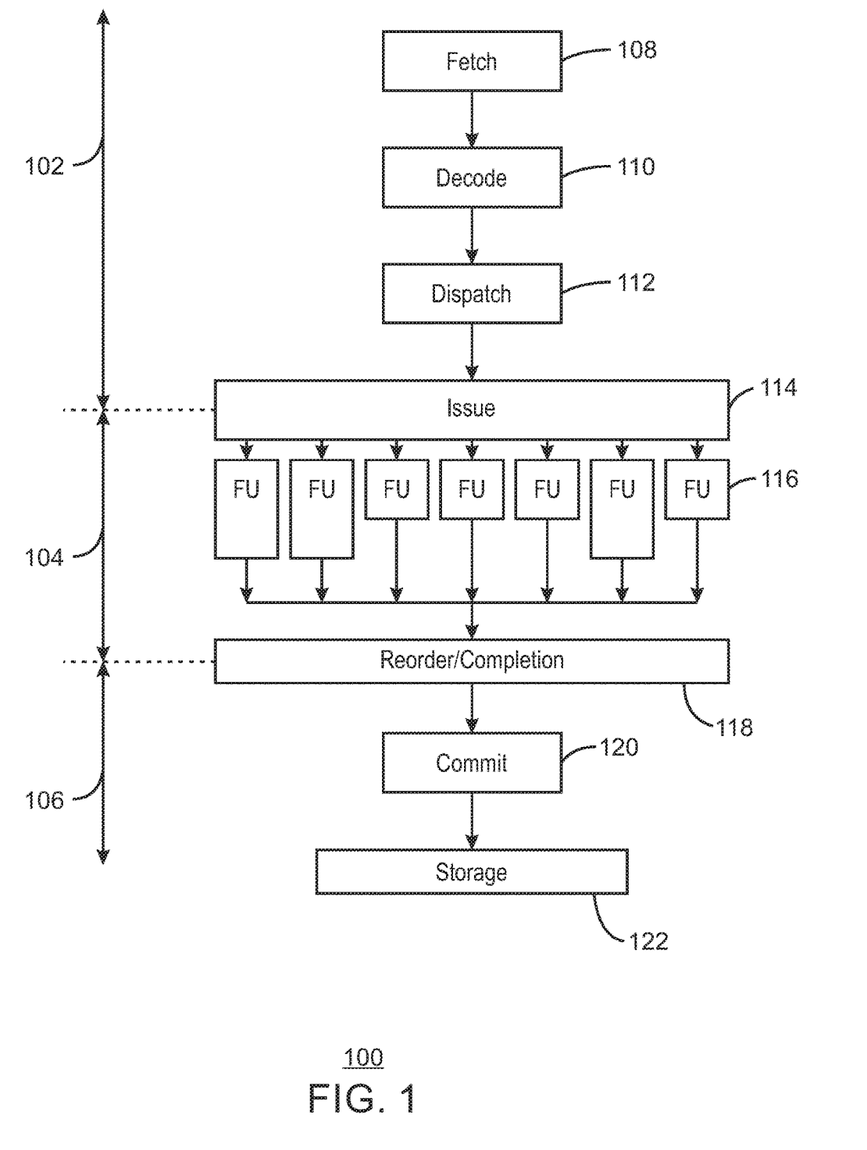
FIG. 1 is a block diagram of an example pipeline for processing instructions out of order using a minimal dependency queue.

With reference now to FIG. 1, a block diagram shows an example pipeline for executing instructions out of order. The example pipeline is generally referred to by the reference number 100 and can be implemented in a processor. For example, the processor can be the processor 502 of FIG. 5 below. The example pipeline 100 of FIG. 1 includes a set of in-order processing stages 102, an out-of-order execution stage 104, and a set of in-order processing stages 106. The set of in-order processing stages 102 include a fetch stage 108, a decode stage 110, and a dispatch stage 112. The out-of-order execution stage 104 includes an issuing stage 114 and a plurality of functional units 116. The in-order processing stages 106 include a reorder/completion stage 118, a commit stage 120, and a storage stage 122.

In the example of FIG. 1, the fetch stage 108 may include fetching multiple instructions in order. For example, the fetch stage 108 may include branch prediction. For example, a local history can be used to predict the direction of branches of instructions. The decode stage 110 may include conversion of operation into microoperations. The decode stage 110 may also include register renaming. For example, the registers may be renamed by the entry number as the microoperations are entered in order. The dispatch stage 112 may include sending the instructions to the issuing stage 114 for out-of-order processing. For example, the instructions may be sent to one or more reservation stations at the issuing stage 114 for out-of-order processing.

Still referring to FIG. 1, the issuing stage 114 may process the instructions out-of-order according to techniques described herein. For example, the issuing stage 114 may include the use of a minimally dependent instruction detector that can detect minimally dependent instructions and send the minimally dependent instructions to a minimal dependency queue, as described in greater detail below with respect to FIG. 2. For example, a minimally dependent instruction may be an unconditional jump that does not have any dependency on other instructions. The minimally dependent instruction detector may also send dependent instructions to a regular issue queue. In some examples, a dependency check can be performed on the instructions in the regular issue queue. A dependency checker of the CPU can check which instruction can be executed from the out-of-order window. For example, the dependency check can detect which instruction is not waiting for a result of another instruction. An age check can be performed on both the instructions that passed the dependency check in the regular issue queue and the instructions in the minimal dependency queue. For example, from a list of minimally dependent instructions, the CPU can select the next instruction to execute. In some examples, the next instruction may be the oldest instruction in the list. The instructions can then be executed out-of-order after passing the age check or both the age check and the dependency check. For example, the functional units 116 may perform one or more arithmetic operations on the instructions. The results of the executed instructions may then be sent to the reorder buffer 118 to be reordered and processed in-order. In some examples, the results of the executed instructions can be sent to the reservation stations of the issuing stage 114. For example, the results may be the dependency source of other instructions to be processed out-of-order. Otherwise, instructions that are marked as executed may be retired in-order. For example, an instruction may be retired once all prior instructions have been retired.

At the commit stage 120, the architectural state of the executed instructions is committed after speculation is resolved. For example, one or more instructions may have been executed speculatively without being actually needed in order to prevent a delay incurred by executing the instructions after the instructions are requested. The state may then be saved to storage in the storage stage 122.

Thus, minimally dependent instructions may be executed without using a dependency check by moving such instructions to a minimal dependency queue rather than the regular issue queue. By not performing the dependency check on the minimally dependent instructions, both time and processing resources may be saved.

It is to be understood that the block diagram of FIG. 1 is not intended to indicate that the pipeline 100 is to include all of the components shown in FIG. 1. Rather, the pipeline 100 can include fewer or additional components not illustrated in FIG. 1 (e.g., additional stages, or functional units, etc.).

Figure 2:
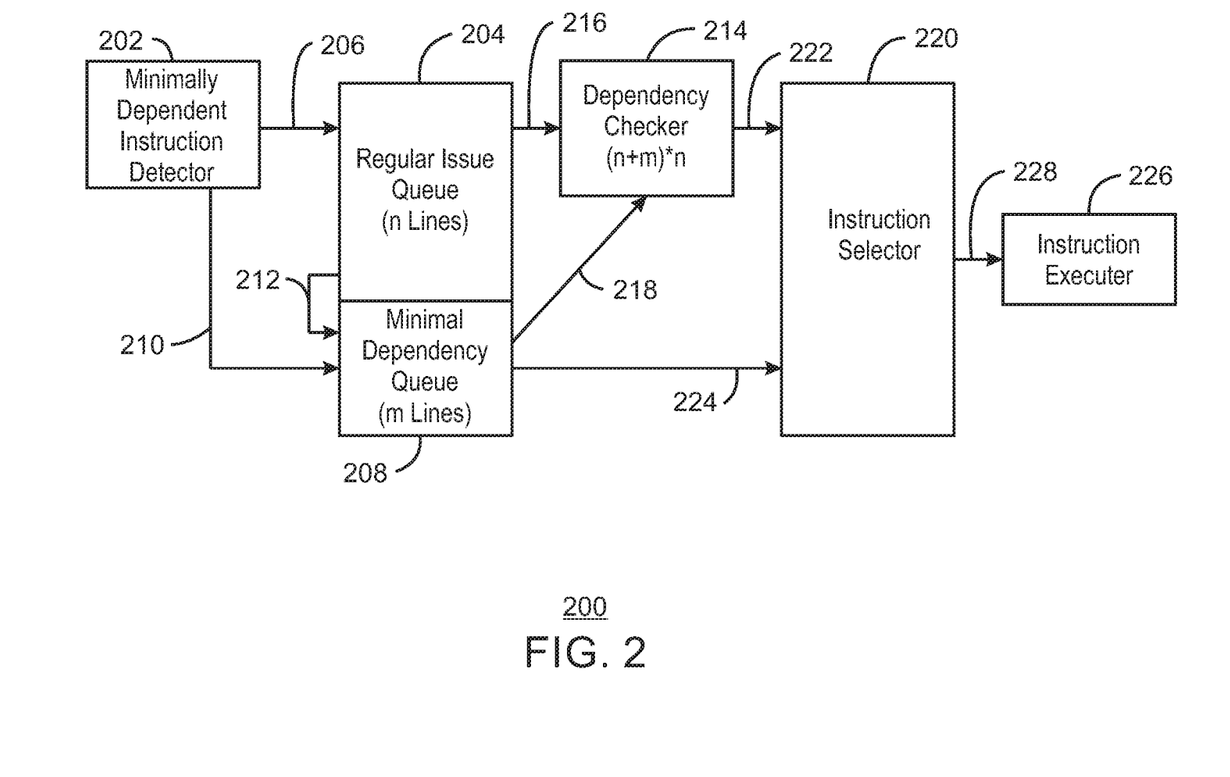
FIG. 2 is a block diagram of an example apparatus for processing instructions out of order using a minimal dependency queue.

FIG. 2 is a block diagram of an example apparatus for processing instructions out of order using a minimal dependency queue. The apparatus is generally referenced using the reference number 200 and can be implemented in the issuing stage 114 of the pipeline 100 of FIG. 1 above or the processor 502 of the computing device 500 of FIG. 5 below. For example, the apparatus 200 may be an issuing unit that can perform the issuing stage 114 described in FIG. 1 above.

The apparatus 200 of FIG. 2 includes a minimally dependent instruction detector 202 communicatively coupled to a regular issue queue 204 as indicated by an arrow 206. The minimally dependent instruction detector 202 is also coupled to a minimal dependency queue as indicated by an arrow 210. The regular issue queue 204 is also communicatively coupled to the minimal dependency queue as indicated by another arrow 212. The apparatus 200 further includes a dependency checker 214 that is communicatively coupled to the regular issue queue 204 as indicated by an arrow 216. The dependency checker 214 is also communicatively coupled to the minimal dependency queue 208 as indicated by an arrow 218. The apparatus 200 also further includes an instruction selector 220 that is communicatively coupled to the dependency checker 214 as indicated by an arrow 222. The instruction selector 220 is also communicatively coupled to the minimal dependency queue 208 as indicated by an arrow 224. The apparatus 200 also include an instruction executer 226 that is communicatively coupled to the instruction selector 220 as indicated by an arrow 228.

As shown in FIG. 2, the apparatus 200 can receive a number of instructions to be executed. For example, the instructions can include dependent instructions and minimally dependent instructions. Dependent instructions may have a regular dependency on one or more other instructions of the received instructions. Minimally dependent instructions may not have any dependency on any of the other instructions. For example, a minimally dependent instruction may be an unconditional jump that does not have any dependency on other instructions. In some examples, a minimally dependent instruction can be detected based on the operation code (opcode) that describes the operation to be performed by the instruction. In some examples, the minimally dependent instruction detector 202 may send an instruction to the regular issue queue 204 in response to detecting that the instruction is a dependent instruction. In some examples, a dependent instruction can be detected based on the operation code (opcode) that describes the operation to be performed by the instruction. For example, the regular issue queue may be n lines in size. In some examples, the minimally dependent instruction detector 202 can send an instruction to the minimal dependency queue in response to detecting that the instruction is a minimally dependent instruction. For example, the minimal dependency queue can be m lines in size. In some examples, minimally dependent instructions can include instructions that are rejected or rescinded, which may also be moved from the regular issue queue to the minimal dependency queue, as indicated by arrow 212. For example, rejected instructions may include instructions that may have resulted in a cache miss. As one example, an instruction may have issued from the regular queue 204. Then the instruction may be issued again due to another reason. For example, the reason for issuing the instruction again may be a cache miss. In this case, the instruction can be treated as a minimally dependent instruction and moved to the minimal dependency queue because the instruction may no longer be dependent on any other instruction, but may still wait for the cache line. In another example, a rejected instruction may be a load instruction sent to a memory unit and the memory unit may not have had the data yet. Thus, the memory unit may reject the load instruction and instruct the issuing unit 200 to reissue the load instruction later in time. In some examples, a rejected instruction may be an instruction with a virtual address that is not translatable and thus rejected. In some examples, rescinded instructions may include instructions that were previously speculatively executed and thus have already had a dependency check. For example, a rescinded instruction may be an instruction that was executed speculatively and is to be reissued. In some examples, a dependency checker 214 can check the dependency of instructions in the regular issue queue 204. For example, the dependency checker 214 can check the dependency of instructions in the regular issue queue 204 on each other and also on instructions in the minimal dependency queue 208 as shown by arrow 218. Thus, given a total number of n lines in the regular issue queue 204 and a total of m lines in the minimal dependency queue 208, the total number of dependencies that the dependency checker 214 may have to check is (n+m)*n. This may be substantially less number of dependencies to check than if all the instructions were in the regular issue queue 204 and checked against each other. For example, if all n+m lines were in the regular issue queue 204, then the total number of dependencies may be (n+m)(n+m) or $(n+m)^2$. Therefore, using a minimal dependency queue may result in substantial efficiency and power saving due to more efficient dependency checking at the dependency checker 214.

The instruction selector 220 can then select an instruction to be executed from a set of eligible instructions. For example, the instruction selector 220 can check the ages of the instructions in the regular issue queue 214 and the minimal dependency queue 208. For example, the instruction selector 220 can check the age of instructions in the regular issue queue 214 in response to detecting that the instructions pass the dependency check. For example, the instruction selector 220 can detect an instruction is older than other instructions in the regular issue queue 214 and the minimal dependency queue 208.

The instruction executer 226 can execute instructions from the regular issue queue 204 or the minimal dependency queue 208. For example, the instruction executer 226 can execute instructions from the regular issue queue 204 or the minimal dependency queue 208 in response to detecting that the instructions pass the age check.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional queues, checks, detectors, issuers, etc.).

Figure 3:
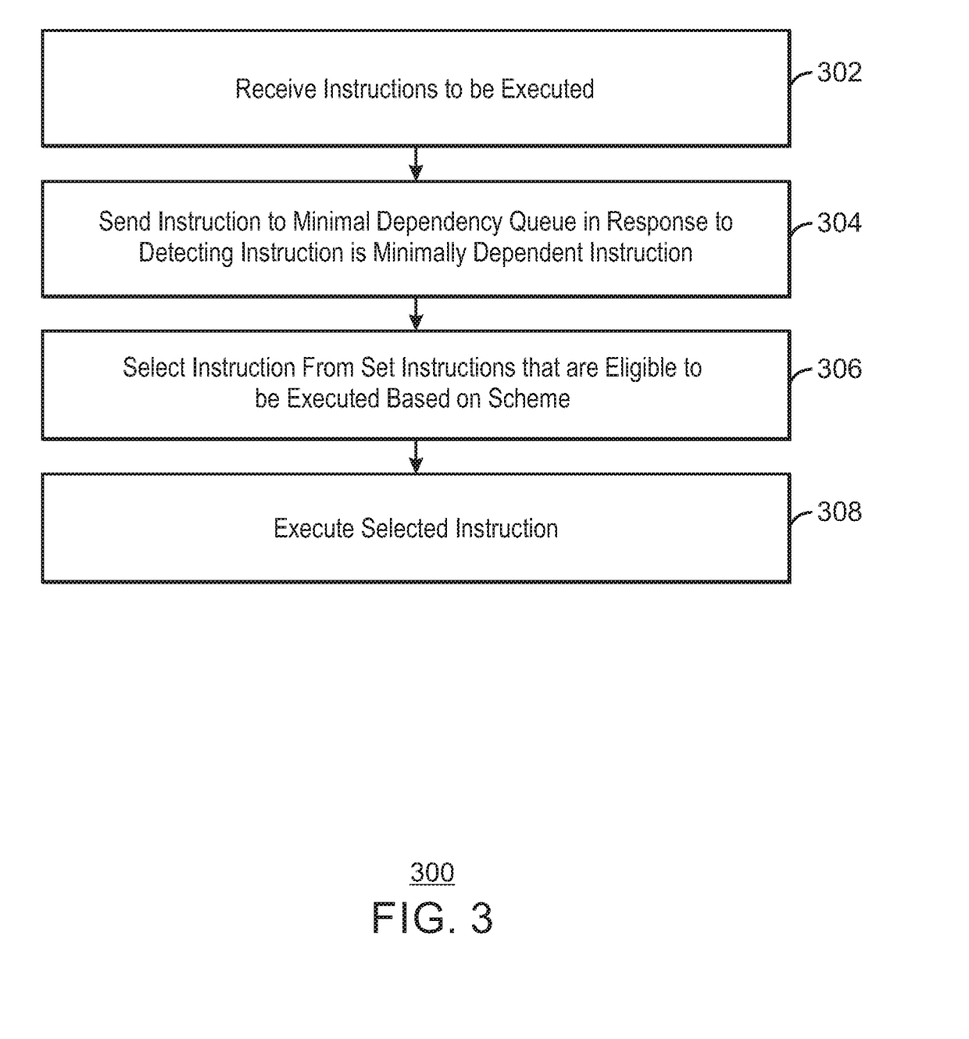
FIG. 3 is a process flow diagram of an example method that can process instructions out of order using a minimal dependency queue.

FIG. 3 is a process flow diagram of an example method that can process instructions out of order using a minimal dependency queue. The method 300 can be implemented with any suitable computing device, such as the computing device 500 of FIG. 5, or using the apparatus 200 of FIG. 2. For example, the methods described below can be implemented in the issuing stage 114 of the pipeline 100 of FIG. 1 above or the processor 502 of the computing device 500 of FIG. 5.

At block 302, a processor receives a number of instructions to be executed. In some examples, the instructions can include minimally dependent instructions and dependent instructions. For example, minimally dependent instructions can include rejected instructions, instructions without dependencies, or instructions with dependencies to other instructions that have been executed.

At block 304, the processor sends an instruction to a minimal dependency queue in response to detecting the instruction is a minimally dependent instruction. For example, a minimally dependent instruction may not have any regular dependency on any other instructions. For example, a minimally dependent or dependent instruction can be detected based on the operation code (opcode) that describes the operation to be performed by the instruction. In some examples, the processor can send instructions to the minimal dependency queue in response to detecting that the instructions are rejected or rescinded. For example, the instructions may be transferred from a regular issue queue to the minimal dependency queue in response to detecting that the instructions have been rejected or rescinded.

At block 306, the processor selects an instruction from a set of instructions that are eligible to be executed based on a scheme. For example, the processor can perform an age check on the instruction in the minimal dependency queue. For example, the age check can include detecting that the instruction is older than other instructions in the out-of-order window. In some examples, the processor may detect that the selected instruction is older than other instructions in the out-of-order window. In some examples, other schemes may be used. For example, a scheme giving priority to branches or instructions executing "loads" may be used.

At block 308, the processor executes the selected instruction. In some examples, the processor can then send the instruction to a reorder buffer to retire the instruction. For example, a retired instruction may be an instruction that has finally executed and its results are correct and visible in the architectural state as if they execute in-order. In some examples, the processor can commit instructions in order by reordering the instructions based on the original order that they were received. The instruction can be retired as discussed above in FIG. 1. For example, the instruction may be retired once all prior instructions have been retired.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
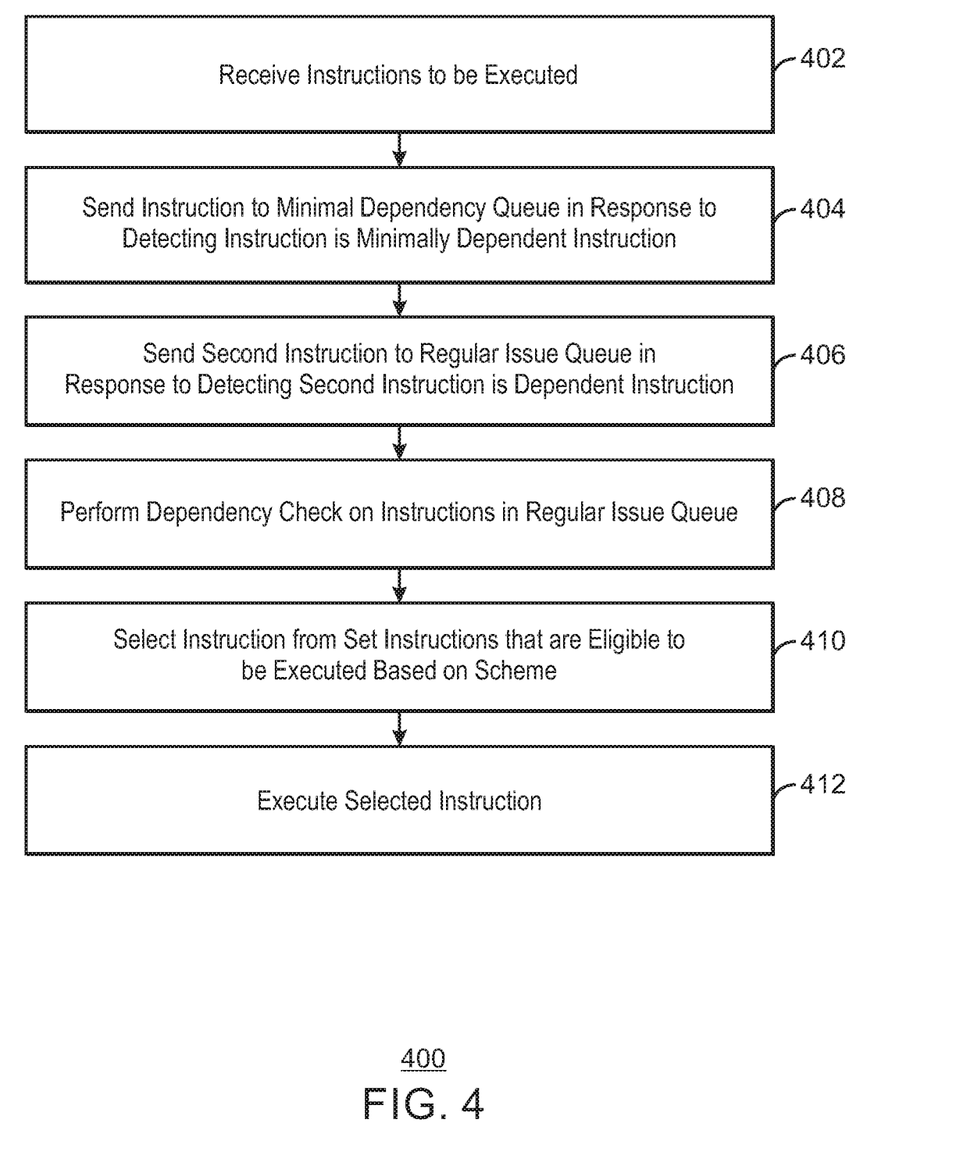
FIG. 4 is process flow diagram of another example method that can process instructions out of order using a minimal dependency queue.

FIG. 4 is a process flow diagram of another example method that can process instructions out of order using a minimal dependency queue. The method 400 can be implemented with any suitable computing device, such as the computing device 500 of FIG. 5, or using the apparatus 200 of FIG. 2. For example, the method described below can be implemented in the processor 502 of the computing device 500 of FIG. 5.

At block 402, a processor receives a number of instructions to be executed. For example, the number of instructions may include dependent instructions and minimally dependent instructions.

At block 404, the processor sends an instruction to a minimal dependency queue in response to detecting the instruction is a minimally dependent instruction. For example, the minimally dependent instruction may be an instruction that does not have any regular dependency on another instruction and thus may not be dependent on other instructions. In some examples, the processor can send an instruction to a minimal dependency queue in response to detecting the instruction is a rejected instruction. In some examples, the processor can send an instruction to a minimal dependency queue in response to detecting the instruction is a rescinded instruction. As one example, a minimally dependent instruction may be an instruction to assign a register A with the value 5. Another example of a minimally dependent instruction may be an instruction to load the register A with the value of register B when register B has no more pending instructions that need to update register B.

At block 406, the processor sends a second instruction to the regular issue queue in response to detecting the second instruction is a dependent instruction. For example, the second instruction may have a dependency on another instruction. In some examples, the second instruction may have a dependency on another instruction in the regular issue queue. In some examples, the second instruction may have a dependency on an instruction in the minimal dependency queue.

At block 408, the processor performs a dependency check on the instructions in the regular issue queue. For example, the processor may determine if the dependencies have been resolved and the output data from the relied upon instructions are available. In some examples, the processor can perform the dependency check on the second instruction in the regular issue queue against other instructions in the regular issue queue and instructions in the minimal dependency queue. In some examples, the processor may detect that the second instruction does not include any dependency on another instruction in the regular issue queue or the minimal dependency queue in an out-of-order window. For example, the instruction that a dependent instruction in the regular issue queue is dependent on may have been executed and ready. Thus, the dependent instruction may be ready to be sent to the age check at block 410.

At block 410, the processor selects an instruction from a set of instructions that are eligible to be executed based on a scheme. For example, the processor can perform an age check on the instructions in the minimal dependency queue and the regular issue queue. For example, the processor may perform the age check on the instructions in the regular issue queue in response to detecting that the instructions passed the dependency check. In some examples, the age check can include detecting that an instruction is older than other instructions in the minimal dependency queue or the regular issue queue, or both. For example, the instruction may be detected as the next instruction to be executed and thus pass the age check. In some examples, the processor can select the oldest instruction from the age check to be executed next. In some examples, the processor can select a number of instructions each cycle depending on the number of available execution pipes. For example, the age check can be tailored to be application specific.

At block 412, the processor executes the selected instruction. In some examples, the instruction can then be sent to a reorder buffer to be retired as discussed above in FIG. 1.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
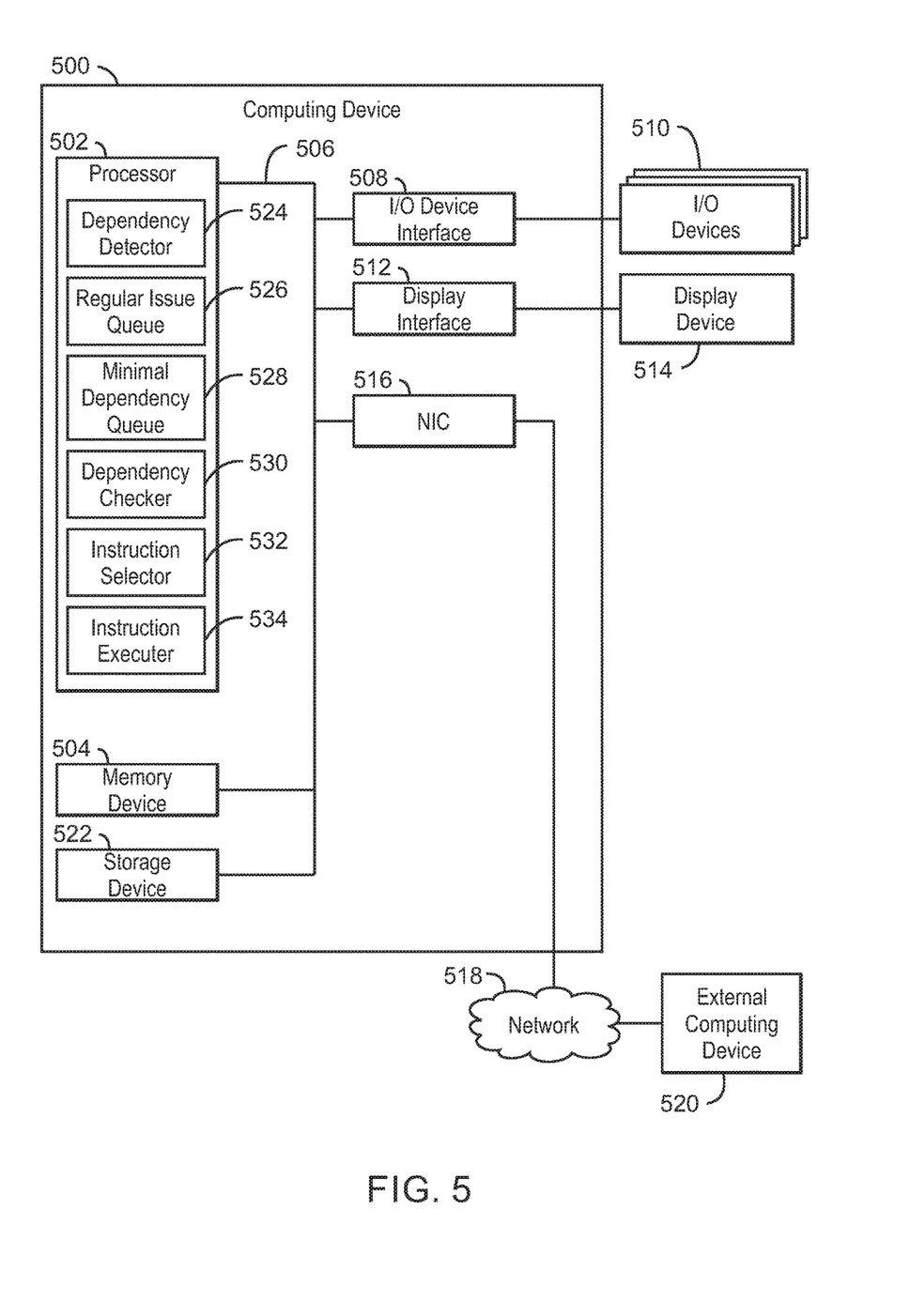
FIG. 5 is a block diagram of an example computing device that can process instructions out of order using a minimal dependency queue.

FIG. 5 is a block diagram of an example computing device that can process instructions out of order using a minimal dependency queue. The computing device 500 may be, for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500 or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the Internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522. For example, the storage device 522 can include a hard drive, an optical drive, a USB flash drive, an array of drives, or any combinations thereof.

The processor 502 can include a dependency detector 524, a regular issue queue 526, a minimal dependency queue 528, a dependency checker 530, an instruction selector 532, and an instruction executer 534. For example, the dependency detector 524 can receive a number of instructions to be executed. The dependency detector 524 can then send an instruction from the plurality of instructions to a minimal dependency queue 528 in response to detecting the instruction includes a minimally dependent instruction. For example, the minimally dependent instruction may not be dependent on other instructions in the plurality of instructions. In some examples, the dependency detector 524 can send an instruction from the plurality of instructions to the regular issue queue 526 in response to detecting an instruction includes a dependent instruction. For example, the dependent instruction may include a regular dependency on another instruction in the number of instructions. In some examples, the dependency detector 524 can send an instruction from the plurality of instructions to a minimal dependency queue in response to detecting the instruction is a rejected instruction. For example, the instruction may have resulted in a cache miss. In some examples, the dependency detector 524 can send an instruction from the plurality of instructions to a minimal dependency queue in response to detecting the instruction is a rescinded instruction. The dependency checker 530 can perform a dependency check on instructions in the regular issue queue 526. For example, the dependency checker 530 can perform the dependency check on the instructions in the regular issue queue against other instructions in the regular issue queue and instructions in the minimal dependency queue. The instruction selector 532 can select an instruction from a set of instructions that are eligible to be executed based on a scheme. For example, the instruction selector 532 can perform an age check on the instruction in the minimal dependency queue 528 or the regular issue queue 526. The instruction selector 532 can select an instruction in response to detecting that the instructions pass the age check. For example, the in response to detecting that the instruction is older than other instructions in the out-of-order window. The instruction executer 534 can execute the selected instruction.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the dependency detector 524, the regular issue queue 526, the minimal dependency queue 528, the dependency checker 530, the instruction selector 532, or the instruction executer 534, may be partially, or entirely, implemented in hardware and/or in the processor 502, as described above. For example, the functionality may be implemented with an application specific integrated circuit, logic implemented in an embedded controller, or in logic or memory implemented in the processor 502, among others. In some embodiments, the functionalities of the dependency detector 524, the regular issue queue 526, the minimal dependency queue 528, the dependency checker 530, the instruction selector 532, or the instruction executer 534, can be implemented with logic, wherein the logic, as referred to herein, can include any suitable hardware (e.g., a processor, among others), software (e.g., an application, among others), firmware, or any suitable combination of hardware, software, and firmware.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a plurality of instructions to be executed;
send a first instruction from the plurality of instructions to a minimal dependency queue in response to detecting the first instruction comprises a minimally dependent instruction, wherein detecting that first instruction comprises a minimally dependent instruction is based on determining that the instruction is not dependent on other instruction in the plurality of instructions that has not been executed;
send a second instruction from the plurality of instructions to a regular issue queue in response to detecting an instruction comprises a dependent instruction;
select an instruction from one of the minimal dependency queue and the regular issue queue to be executed based on a scheme; and
execute the selected instruction.

2. The system of claim 1, wherein the processor is to:
perform a dependency check on the second instruction in the regular issue queue;
perform an age check on the second instruction in response to detecting that the second instruction passed the dependency check; and
execute the second instruction in response to detecting that the instruction passes the age check.

3. The system of claim 2, wherein the dependent instruction comprises a regular dependency on another instruction in the plurality of instructions.

4. The system of claim 2, wherein the processor is to perform the dependency check on the second instruction in the regular issue queue against other instructions in the regular issue queue and instructions in the minimal dependency queue.

5. The system of claim 1, wherein the processor is to send a third instruction from the plurality of instructions to a minimal dependency queue in response to detecting the instruction comprises a rejected instruction.

6. The system of claim 1, wherein the processor is to send a third instruction from the plurality of instructions to a minimal dependency queue in response to detecting the instruction comprises a rescinded instruction.

7. A computer-implemented method, comprising:
receiving, via a processor, a plurality of instructions to be executed;
sending, via the processor, a first instruction from the plurality of instructions to a minimal dependency queue in response to detecting the first instruction comprises a minimally dependent instruction, wherein detecting that first instruction comprises a minimally dependent instruction is based on determining that the instruction is not dependent on other instruction in the plurality of instructions that has not been executed;
sending a second instruction from the plurality of instructions to a regular issue queue in response to detecting an instruction comprises a dependent instruction;
selecting, via the processor, an instruction from one of the minimal dependency queue and the regular issue queue based on a scheme; and
executing, via the processor, the selected instruction.

8. The computer-implemented method of claim 7, comprising performing a dependency check on the second instruction in the regular issue queue.

9. The computer-implemented method of claim 8, comprising performing, via the processor, an age check on the second instruction in response to detecting that the second instruction passed the dependency check.

10. The computer-implemented method of claim 9, comprising executing, via the processor, the second instruction in response to detecting that the instruction passes the age check.

11. The computer-implemented method of claim 7, comprising sending, via the processor, an instruction from the plurality of instructions to a minimal dependency queue in response to detecting the instruction comprises a rejected instruction.

12. The computer-implemented method of claim 7, comprising sending, via the processor, an instruction from the plurality of instructions to a minimal dependency queue in response to detecting the instruction comprises a rescinded instruction.

13. An apparatus, comprising a processor configured to:
receive a plurality of instructions to be executed;
send a first instruction from the plurality of instructions to a minimal dependency queue in response to detecting the first instruction comprises a minimally dependent instruction, wherein detecting that first instruction comprises a minimally dependent instruction is based on determining that the instruction is not dependent on other instruction in the plurality of instructions that has not been executed;
send a second instruction from the plurality of instructions to a regular issue queue in response to detecting the second instruction comprises a dependent instruction;
perform a dependency check on instructions in the regular issue queue;
select an instruction from one of the minimal dependency queue and the regular issue queue based on a scheme; and
execute the selected instruction.

14. The apparatus of claim 13, comprising program code executable by the processor to execute the second instruction in response to detecting that the second instruction passes both the dependency check and an age check.

15. The apparatus of claim 13, comprising program code executable by the processor to send a third instruction from the plurality of instructions to a minimal dependency queue in response to detecting that the third instruction comprises a rejected instruction.

16. The apparatus of claim 13, comprising program code executable by the processor to send a third instruction from the plurality of instructions to a minimal dependency queue in response to detecting that the third instruction comprises a rescinded instruction.

17. The apparatus of claim 13, comprising program code executable by the processor to detect the second instruction comprises the dependent instruction if the second instruction comprises a regular dependency on another instruction.

* * * * *